Nov. 23, 1943.   C. B. MIRICK ET AL   2,334,722
SUPPRESSOR CONDENSER INTEGRAL WITH BRUSH HOLDERS
Filed June 26, 1941
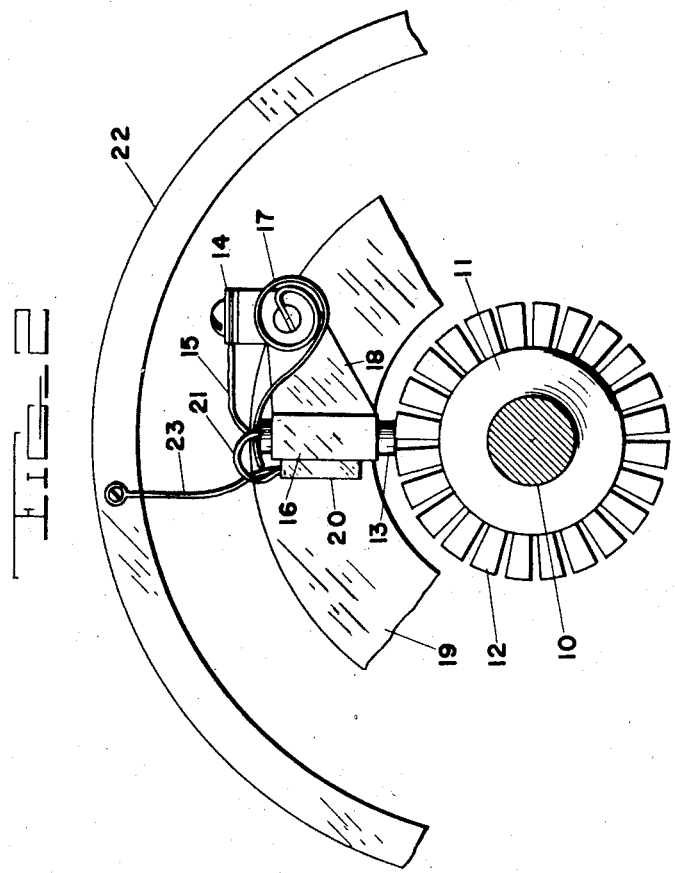
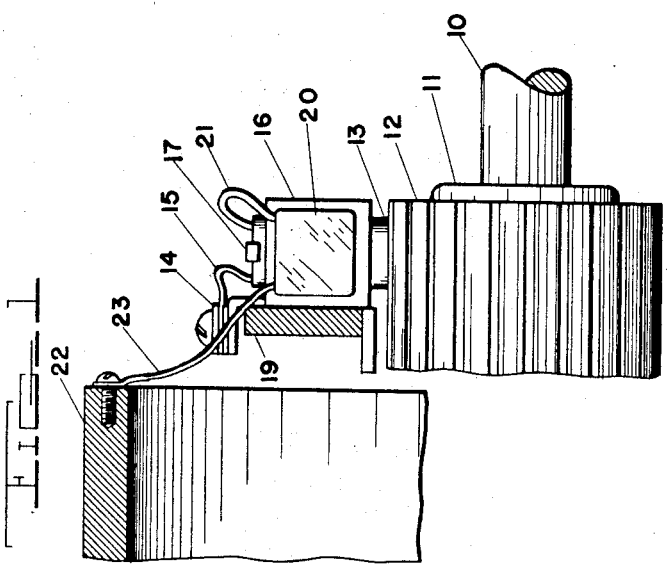
INVENTORS
Carlos B. Mirick
BY Albert P. Green
ATTORNEY Patented Nov. 23, 1943

2,334,722

UNITED STATES PATENT OFFICE 2,334,722

SUPPRESSOR CONDENSER INTEGRAL WITH BRUSH HOLDER

Carlos B. Mirick and Albert P. Green, Washington, D. C.

Application June 26, 1941, Serial No. 399,857

3 Claims. (Cl. 171—324)

(Granted under the act of March 3, 1883, as amended April 30, 1928; 370 O. G. 757)

This invention relates to electrical apparatus and more particularly to an arrangement for effectively eliminating electrical interference in radio reception caused by operation of certain electrical machines.

It has been found that during operation of electrical machines of the type wherein relative movement occurs during operation thereof between electrically conducting members, such as the commutator and brushes of the ordinary electric motor or of a machine for generating electric energy, that sparks occur at the point of contact between such members and that the formation of such sparks originate high frequency oscillations, which, in turn, cause electrical interference in radio reception. Various arrangements have heretofore been proposed for eliminating electrical interference in radio reception caused in the above manner. Although these prior arrangements utilized electric interference eliminating elements, such as condensers, they do not operate effectively to eliminate all electrical interference which occurs upon operation of electrical machines of the foregoing type, nor do they provide an adequate installation of the electrical interference eliminating elements whereby the latter may operate at the highest possible efficiency to suppress and bypass the high frequency oscillations.

It is therefore an object of the present invention to provide a novel arrangement for eliminating the foregoing disadvantages.

Another object is to provide a novel arrangement for effectively eliminating all electrical interference occasioned by relative movement between certain elements of various electrical apparatus.

Still another object is to provide in an arrangement of the foregoing character, a novel structure for utilizing electric interference eliminating elements, such as condensers, in an effective manner.

Still another object of the present invention is to provide a novel arrangement in connection with electrical machines having a commutator and brushes for effectively eliminating all electrical interference occasioned by relative movement between the commutator and the brushes.

A further object is to provide in a structure of the above type a novel arrangement for positioning electrical interference eliminating elements near the point where electrical interferences originate whereby such elements are effectively utilized for eliminating such electrical interference.

Other objects and features of the present invention will appear more fully hereinafter from the following detailed description when considered with the attached drawing which illustrates one embodiment of the invention. It is to be expressly understood, however, that the drawing is designed for purposes of illustration only and not as a definition of the limits of the invention, reference being had for the latter purpose to the appended claims.

In the drawing, wherein similar reference characters denote similar parts throughout the several views:

Fig. 1 is a diagrammatic view, partly in section, of a structure embodying the principles of the present invention, and Fig. 2 is a diagrammatic view, showing another view of the structure disclosed in Fig. 1.

Referring more particularly to the drawing, an arrangement constructed according to the principles of the present invention is disclosed therein which includes a shaft 10 of an electric motor, generator or any other electrical machine of this type, not shown. A commutator 11, constructed in the usual manner having a plurality of segments 12 positioned about the periphery thereof, is rigidly secured to the shaft 10 and is adapted to rotate therewith. A brush 13 is provided for forming an electrical connection between the segments of the commutator and a terminal 14 of the electrical machine through a wire 15 in a conventional manner. The brush 13 is mounted for substantially free longitudinal movement in a support member 16 and one end thereof is held in electrical contact with the periphery of the commutator by means of a spring 17 bearing on the other end. A member 18, attached to or forming a part of the member 16, secures the brush 13 and the support therefor on a stationary portion of the electrical machine, such as an insulated portion 19. The member 18 also forms a support for the terminal 14.

As heretofore stated, the present invention provides means for effectively eliminating all electrical interference, consisting of high frequency oscillations caused by relative movement between certain electrically conducting elements of various electrical machines, and for installing and electrically connecting electrical interference eliminating elements in such a manner that the same may operate at maximum efficiency to suppress and bypass the high frequency oscillations whereby such oscillations will not cause electrical interference in radio reception.

Such means, as shown in the drawings, includes an electrical interference eliminating element 20 which may take the form of a usual condenser having high and low potential connections thereof. The element 20 is secured to or constructed integral with the brush supporting member 16 so that the high potential connection of the condenser is in electrical contact with the supporting member. Such construction is provided since it has been found that condensers, when utilized as electrical interference eliminators, operate at maximum efficiency when mounted adjacent the junction where the high frequency oscillations, or the source of electrical interference, originates. In order to further increase the efficiency of the condenser for suppressing and bypassing high frequency oscillations a positive electrical connection is provided between the high potential connection of the condenser and the brush 13, which connection comprises a wire 21 which may be substantially short since the condenser is positioned adjacent the brush. It is to be expressly understood, however, that the load through the brush 13 is carried by the connector 15, and not by means of the wire 21. The low potential side of the condenser 20 is electrically connected to an adjacent, non-insulated portion of the machine, such as portion 22 of the frame thereof, through a wire 23, to thus complete the electrical circuit.

The present invention thus provides a novel arrangement for effectively eliminating high frequency oscillations which occur upon sparking about the commutators of various electrical machines, which, in turn, cause electrical interference in radio reception. A novel arrangement for utilizing electrical interference eliminating elements is also disclosed by the present invention, wherein the elements are positioned adjacent the point or junction where the frequency oscillations originate whereby the electrical connectors required to complete the circuit may be very short to thus increase the efficiency of the elements for suppressing and bypassing frequency oscillations.

Although only one embodiment of the invention has been shown and described in detail herein, it is to be expressly understood that various changes and substitutions may be incorporated therein without departing from the spirit of the invention as well understood by those skilled in the art. Reference will, therefore, be had to the appended claims as a definition of the limits of the invention.

The invention described herein may be manufactured and/or used by or for the Government of the United States of America for governmental purposes without the payment of any royalties thereon or therefor.

What is claimed is:

1. In an electrical apparatus having a frame, a commutator mounted for rotation in said frame, a brush in electrical contact with said commutator, a support for said brush, a condenser having high and low potential connections, means for positioning the condenser on said support whereby the latter is electrically connected to the high potential connection of said condenser, an electrical conductor connecting said high potential connection directly to said brush, means for electrically connecting the low potential connection of said condenser to the frame whereby the condenser effectively operates to bypass and suppress high frequency oscillations, and another electrical conductor connected to said brush for carrying the electrical load of the apparatus.

2. In an electrical machine having a rotatable member, a non-rotatable member in electrical contact with said rotatable member, a support for said non-rotatable member, electrical interference eliminating means positioned on said support, and a plurality of electrical conductors connected to said non-rotatable member, one of said conductors serving to electrically connect said electrical interference eliminating means and said non-rotatable member, and the others serving to carry the electrical load of the machine.

3. An electrical machine having a commutator and a brush in electrical contact with said commutator, a support for said brush, electrical interference eliminating means positioned on said support, and a plurality of electrical conductors connected to said brush, one of said conductors serving to electrically connect said electrical interference eliminating means and said brush, and another one of said conductors serving to carry the electrical load of said machine.

CARLOS B. MIRICK.
ALBERT P. GREEN.